(12) United States Patent
Hikai

(10) Patent No.: US 8,042,310 B2
(45) Date of Patent: Oct. 25, 2011

(54) FASTENING MEMBER AND EXTERNAL WALL CONSTRUCTION STRUCTURE

(75) Inventor: Satoshi Hikai, Nagoya (JP)

(73) Assignee: Nichiha Co., Ltd, Nagoya-shi (JP)

( * ) Notice: Subject to any disclaimer, the term of this patent is extended or adjusted under 35 U.S.C. 154(b) by 884 days.

(21) Appl. No.: 11/581,802

(22) Filed: Oct. 17, 2006

(65) Prior Publication Data

US 2007/0113515 A1    May 24, 2007

(51) Int. Cl.
*E04B 2/30* (2006.01)

(52) U.S. Cl. ... 52/489.2; 52/235; 52/506.05; 52/506.09; 52/512; 403/381

(58) Field of Classification Search ............ 52/235, 52/489.1, 489.2, 506.05, 506.06, 506.08, 52/506.09, 512; 403/381
See application file for complete search history.

(56) References Cited

U.S. PATENT DOCUMENTS

| | | | | |
|---|---|---|---|---|
| 4,021,990 | A * | 5/1977 | Schwalberg | 52/479 |
| 5,337,525 | A * | 8/1994 | Zaccai et al. | 52/35 |
| 6,315,489 | B1 * | 11/2001 | Watanabe | 403/381 |
| 6,460,311 | B1 * | 10/2002 | Ito | 52/489.1 |
| 2001/0045075 | A1 * | 11/2001 | Watanabe | 52/712 |

FOREIGN PATENT DOCUMENTS

| | | | |
|---|---|---|---|
| JP | 2000274042 A | * | 10/2000 |
| JP | 2001032500 A | * | 2/2001 |
| JP | 2005-133504 | | 5/2005 |

* cited by examiner

*Primary Examiner* — Brian Glessner
*Assistant Examiner* — Adriana Figueroa
(74) *Attorney, Agent, or Firm* — Edwards Angell Palmer & Dodge LLP

(57) ABSTRACT

The present invention aims to provide a fastening member excellent in strength of fastening a decorative external panel and capable of constructing an external wall surface excellent in design appearance, and an external wall structure. The fastening member 1 is used for fastening the decorative external panel 6 to a plurality of the underlying panels 5 disposed in front of the construction frame 3 of a building. This fastening member 1 has a base plate portion 11, a supporting portion 13, an upper panel engaging portion 131, and a lower panel engaging portion 132. The base plate portion 10 has, at its portion above the supporting portion 13, a first screw hole 110 and a second screw hole 120 differing in the distance from the supporting portion 13. A first base plate portion 11 of the base plate portion 10 in which the first screw hole 110 farther away from the supporting portion 13 is formed and a second base plate portion 12 of the base plate portion 10 in which the second screw hole 120 closer to the supporting portion 13 is formed form an obtuse angle therebetween. The first base plate portion 11 is inclined rearward with respect to the second base portion 12 toward an upper side of the first base portion 11.

8 Claims, 12 Drawing Sheets

FASTENING MEMBER AND EXTERNAL WALL CONSTRUCTION STRUCTURE

BACKGROUND OF THE INVENTION

1. Field of the Invention

The present invention relates to a fastening member for fastening a decorative external panel to a front surface of an underlying panel disposed in front of a construction frame of a building, and an external wall construction structure using the fastening member.

2. Description of the Related Art

Conventionally, there exists an external wall construction structure in which fastening members are fastened to underlying panels disposed in front of a construction frame of a building and a plurality of external wall panels are engaged with the fastening members (see, e.g., Japanese Unexamined Laid-open Patent Publication No. 2005-133504).

Furthermore, as shown in FIG. 14, there also exists an external wall construction structure 97 in which decorative external panels 96 are disposed in front of underlying panels 95 disposed in front of a construction frame 93.

This external wall construction structure 97 includes an underlying panel 95 disposed in front of a construction frame 93, a fastening member 91 fastened to the front surface of the underlying panel 95, and a decorative external panel 96 engaged with the fastening member 91.

The fastening member 91 has a base plate portion 910 and a supporting portion 913, and is fastened to the underlying panel 95 with a screw 92 inserted in a screw hole 920 formed in the base plate portion 910.

In the aforementioned external wall construction structure 97, since various functions required for external wall construction structure, such as, e.g., waterproofing, can be given to the underlying panel 95, the decorative external panel 96 can be specialized in achieving an ornamental function. Consequently, the weight of the decorative external panel 96 can be reduced, thereby enabling the use of a thin and low-cost fastening member 91.

In cases where a screw 92 is inserted into the fastening member 91 located at a vertical position approximately the same vertical position of the end portion 950 of the underlying panel 95, the screw 92 will be screwed into the end portion 950 of the underlying panel 95 which is relatively weak in strength, which may cause cracking and/or breaking of the end portion 950. As a result, this could lead to difficulty in obtaining external wall construction structure 97 having sufficient strength.

On the other hand, in order to secure a sufficient distance between the end portion 950 and a screw hole 920 of the fastening member 91, it can be considered to configure the fastening member 91 such that a plurality of screw holes 920 are arranged at intervals along the vertical (up-and-down) direction so that a screw 92 can be inserted into a screw hole 920 farther away from the end portion 950.

In this case, however, since the vertical length of the base plate portion 910 becomes longer, the fastening of the base plate portion 910 with a screw 92 using a screw hole 920 farther away from the supporting portion 913 results in an increased distance between the screw hole 920, serving as a fulcrum and the supporting portion 913, serving as a working point. This may cause a deformation of the base plate portion 910 when bending stress acts on the base plate portion 910.

Especially, since the fastening member 91 is formed into a thin member as mentioned above, the base plate portion 910 is decreased in bending strength. Therefore, supporting the decorative external panel 96 may cause frontward bending of the lower end 912 of the base plate portion 910. This in turn causes an inclination of the decorative external panel 96 to the underlying panel 95, resulting in misaligned decorative surfaces 960 of the decorative external panels 96, which deteriorates the design appearance.

SUMMARY OF THE INVENTION

The present invention was made in view of the aforementioned conventional problems, and aims to provide a fastening member excellent in strength for fastening a decorative external panel and capable of constructing an external wall surface excellent in design appearance.

The first embodiment is directed to a fastening member for fastening a plurality of decorative external panels to underlying panels at the time of disposing the plurality of decorative external panels in front of a plurality of underlying panels disposed in front of a construction frame of a building, the fastening member comprising:

a base plate portion having a rear surface which comes into contact with the underlying panel;

a supporting portion frontwardly protruded from the base plate portion and configured to support a lower side of an upper side decorative external panel;

an upper panel engaging portion upwardly extended from a front end of the supporting portion and configured to be engaged with a lower side of the upper side decorative external panel; and a lower panel engaging portion downwardly extended from the front end of the supporting portion and configured to be engaged with an upper side of a lower side decorative external panel, wherein the base plate portion is provided with a first screw hole and a second screw hole differing in distance from the supporting portion, the first screw hole and the second screw hole being located above the supporting portion, wherein a first base plate portion of the base plate portion in which the first screw hole farther away from the supporting portion is formed and a second base plate portion of the base plate portion in which the second screw hole closer to the supporting portion is formed form an obtuse angle therebetween, and wherein the first base plate portion is inclined rearward with respect to the second base portion toward an upper side of the first base portion.

(See claim 1)

Next, functions and effects of the present invention will be explained.

The base plate portion is provided with the first screw hole and the second screw holes differing in distance from the supporting portion with each other. Thus, in cases where the fastening member is disposed at the vicinity of the joint portion of the upper and lower underlying panels, a screw can be inserted into one of the first screw hole and the second screw hole farther away from the end portion of the underlying panel. That is, according to the fastening member, it is possible to avoid that a screw is screwed into the end portion of the underlying panel, thereby causing no cracking and/or breaking of the underlying panel, which results in a fastening member excellent in strength of fastening decorative external panels.

The first base plate portion is inclined to the second base plate portion toward the upper side of the first base plate portion. Thereby, when a screw is inserted into either the first screw hole or the second screw hole to fasten the fastening member to the underlying panel, the upper edge of the first base plate portion and the lower edge of the second base plate portion can be brought into contact with the underlying panel assuredly. With this, the upper panel engaging portion and the lower panel engaging portion formed at the second base plate portion will be assuredly held near the front surface of the underlying panel.

Therefore, the lower side and the upper side of the decorative external panel engaged with the upper panel engaging portion and the lower panel engaging portion respectively can be assuredly held near the front surface of the underlying panel. Thus, it becomes possible to prevent occurrence of unevenness on the decorative surface of the external wall construction structure constituted by a plurality of the decorative external panels, resulting in an external wall construction structure excellent in design appearance.

In a state in which a screw is inserted into the first screw hole to fasten the fastening member to the underlying panel, the upper or lower side of the decorative external panel engaged with the fastening member may cause a force of frontwardly pulling the second base plate portion. As mentioned above, however, the first base plate portion is inclined rearward to the second base plate portion toward the upper side of the first base plate portion. In other words, the second base plate portion is inclined rearward to the first base plate portion toward the lower side of the second base plate portion.

Therefore, even if a force of frontwardly pulling the second base plate portion is applied, the fastening member will not be bent such that the lower edge of the second base plate portion is frontwardly lifted up. Consequently, even in cases where a screw is inserted into the first screw hole to fasten the fastening member to the underlying panel, it is possible to prevent occurrence of unevenness on the decorative surfaces of the plurality of the decorative external panels.

As discussed above, the aforementioned embodiment can provide a fastening member excellent in strength of fastening a decorative external panel and capable of constructing an external wall surface excellent in design appearance.

The second embodiment is directed to a fastening member for fastening a plurality of decorative external panels to underlying panels at the time of disposing the plurality of decorative external panels in front of a plurality of underlying panels disposed in front of a construction frame of a building, the fastening member comprising:

a base plate portion having a rear surface which comes into contact with the underlying panel;

a supporting portion frontwardly protruded from the base plate portion and configured to support a lower side of an upper side decorative external panel;

an upper panel engaging portion upwardly extended from a front end of the supporting portion and configured to be engaged with a lower side of the upper side decorative external panel; and a lower panel engaging portion downwardly extended from the front end of the supporting portion and configured to be engaged with an upper side of a lower side decorative external panel, wherein the base plate portion is provided with a first screw hole and a second screw hole differing in distance from the supporting portion, the first screw hole and the second screw hole being located above the supporting portion, and wherein the base plate portion is curved in an up-and-down direction such that an upper edge and a lower edge of the base plate portion are located rearward than the other portion. (See claim 2)

Also in this case, like the first embodiment (claim 1), since the base plate portion has the first screw hole and the second screw hole, it is possible to provide a fastening member causing no cracking and/or breaking of the underlying panel and excellent in fastening strength of decorative external panels.

Furthermore, since the base plate portion is curved as mentioned above, like the aforementioned first embodiment, it becomes possible to prevent occurrence of unevenness on the decorative surface of the external wall construction structure constituted by a plurality of the decorative external panels, resulting in external wall construction structure excellent in design appearance.

Furthermore, even in cases where a screw is inserted into the first screw hole to fasten the fastening member to the underlying panel, it is possible to prevent occurrence of unevenness on the decorative surface of the external wall construction structure constituted by a plurality of the decorative external panels.

As discussed above, the aforementioned embodiment can provide a fastening member excellent in strength of fastening a decorative external panel and capable of constructing an external wall surface excellent in design appearance.

The third embodiment is directed to external wall construction structure, comprising:

a plurality of underlying panels disposed in front of a construction frame of a building;

a plurality of fastening members fastened to a front surface of the underlying panel; and a plurality of decorative external panels fastened to the underlying panels with the fastening members, wherein the fastening member includes:

a base plate portion having a rear surface which comes into contact with the underlying panel;

a supporting portion frontwardly protruded from the base plate portion and configured to support a lower side of an upper side decorative external panel;

an upper panel engaging portion upwardly extended from a front end of the supporting portion and configured to be engaged with a lower side of the upper side decorative external panel; and a lower panel engaging portion downwardly extended from the front end of the supporting portion and configured to be engaged with an upper side of a lower side decorative external panel, wherein the base plate portion is provided with a first screw hole and a second screw hole differing in distance from the supporting portion, the first screw hole and the second screw hole being located above the supporting portion, wherein a first base plate portion of the base plate portion in which the first screw hole farther away from the supporting portion is formed and a second base plate portion of the base plate portion in which the second screw hole closer to the supporting portion is formed form an obtuse angle therebetween, wherein the first base plate portion is inclined rearward with respect to the second base portion toward an upper side of the first base portion, and wherein the fastening member is fastened to the underlying panel with a screw inserted in either the first screw hole or the second screw hole and screwed into the underlying panel. (See claim 5)

The base plate portion of the fastening member in the external wall construction structure is provided with the first screw hole and the second screw hole differing in distance from the supporting portion. Therefore, as mentioned above, it is possible to avoid screwing a screw into the end portion of the underlying panel. As a result, the external wall construction structure causing no cracking and/or breaking of the underlying panel and excellent in strength of fastening the decorative external panel can be obtained.

Furthermore, the first base plate portion is inclined to the second base plate portion toward the upper side of the first base plate portion. Thereby, the upper edge of the first base plate portion and the lower edge of the second base plate portion can be brought into contact with the underlying panel assuredly. Therefore, the lower side and the upper side of the decorative external panel engaged with the upper panel engaging portion and the lower panel engaging portion respectively can be assuredly held near the front surface of the underlying panel. Thus, it becomes possible to prevent occurrence of unevenness on the decorative surface of the external wall construction structure constituted by a plurality of the decorative external panels, resulting in external wall construction structure excellent in design appearance.

Furthermore, since the second base plate portion is inclined rearward with respect to the first base plate portion toward the lower side of the second base plate portion, in a state in which a screw is inserted into the first screw hole to fasten the fastening member to the underlying panel, even if a force of frontwardly pulling the second base plate portion is applied, the fastening member will not be bent such that the lower edge of the second base plate portion is frontwardly lifted up. Consequently, even in cases where a screw is inserted into the first screw hole to fasten the fastening member to the underlying panel, it is possible to prevent occurrence of unevenness on the decorative surfaces of the plurality of the decorative external panels.

As discussed above, the aforementioned embodiment can provide a fastening member excellent in strength of fastening a decorative external panel and capable of constructing an external wall surface excellent in design appearance.

The fourth embodiment is directed to external wall construction structure, comprising:

a plurality of underlying panels disposed in front of a construction frame of a building;

a plurality of fastening members fastened to a front surface of the underlying panel; and a plurality of decorative external panels fastened to the underlying panels with the fastening members, wherein the fastening member includes:

a base plate portion having a rear surface which comes into contact with the underlying panel;

a supporting portion frontwardly protruded from the base plate portion and configured to support a lower side of an upper side decorative external panel;

an upper panel engaging portion upwardly extended from a front end of the supporting portion and configured to be engaged with a lower side of the upper side decorative external panel; and a lower panel engaging portion downwardly extended from the front end of the supporting portion and configured to be engaged with an upper side of a lower side decorative external panel, wherein the base plate portion is provided with a first screw hole and a second screw hole differing in distance from the supporting portion, the first screw hole and the second screw hole being located above the supporting portion, and wherein the base plate portion is curved in an up-and-down direction such that an upper edge and a lower edge of the base plate portion are located rearward than the other portion. (See Claim 6)

Also in this case, like the third embodiment (claim 5), the external wall construction structure causing no cracking and/ or breaking of the underlying panel and excellent in strength of fastening the decorative external panel can be obtained.

Furthermore, it is possible to prevent occurrence of unevenness on the decorative surface of the external wall construction structure constituted by a plurality of the decorative external panels, and the external wall construction structure excellent in design appearance can be obtained.

Furthermore, even in cases where a screw is inserted into the first screw hole to fasten the fastening member to the underlying panel, it is possible to prevent occurrence of unevenness on the decorative surfaces of the plurality of the decorative external panels.

As discussed above, the aforementioned embodiment can provide a fastening member excellent in strength of fastening a decorative external panel and capable of constructing an external wall surface excellent in design appearance.

BEST MODE FOR CARRYING OUT THE INVENTION

Figure 1:
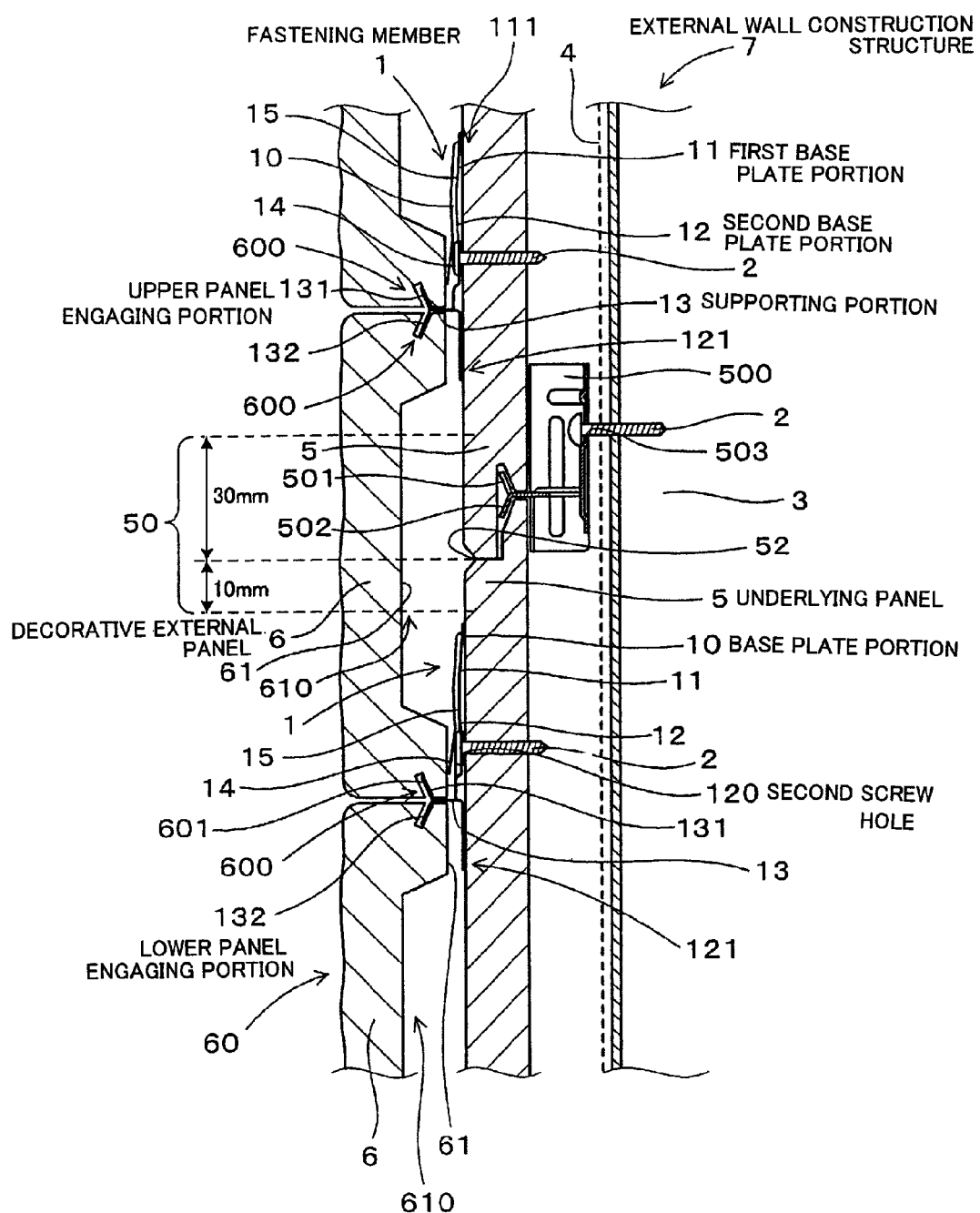
FIG. 1 is a cross-sectional explanatory view showing external wall construction structure according to a first embodiment of the present invention.

In the first embodiment (claim 1) and the third embodiment (claim 5), the first base plate portion and the second base plate portion can be inclined mutually such that the upper edge of the first base plate portion is located rearward by, e.g., about 0.5 mm to about 1.5 mm with respect to the plane containing the second base plate portion. The base plate portion can be, for example, locally bent at a portion between the first base plate portion and the second base plate portion, or can be curved circularly.

Furthermore, in the second embodiment (claim 2) and the fourth embodiment (claim 6), the base plate portion can be curved along the up-and-down direction such that the upper edge and the lower edge of the base plate portion are located rearward by, e.g., about 0.5 mm to about 1.5 mm with respect to the most frontwardly positioned portion of the base plate portion.

Furthermore, in the first embodiment (claim 1), the second embodiment (claim 2), the third embodiment (claim 5) and the fourth embodiment (claim 6), the first screw hole and the second screw hole can be apart from each other by, e.g., about 30 mm to about 50 mm in the up-and-down direction.

As the material of the fastening member, stainless steel, etc., can be used for example.

The fastening member can be produced by, for example, forming a base plate portion, the supporting portion, the upper panel engaging portion, the lower panel engaging portion, the first screw hole, and the second screw hole, and then bending the base plate portion.

The decorative external panel can be a panel made of, for example, ceramic series material or cement series material.

The external wall construction structure can be constructed in either new building or remodeling.

In this specification, the explanation is made by referring to the outside of a building as the "front" and the opposite side as the "rear."

Furthermore, as to each member, the explanation is made by referring to as "front," "rear," "left," "right," "up," "down" on the basis of the state in which each member is disposed on a construction frame of a building.

In the first embodiment (claim 1) and the second embodiment (claim 2), it is preferable that the base plate portion has a spring portion frontwardly protruded from the base plate portion and configured to come into contact with a rear side surface of the decorative external panel to frontwardly press the decorative external panel.
(see claim 3)

In this case, for example, even in cases where the decorative external panels are uneven in thickness, the anteroposterior positions of the decorative surfaces of the decorative external panels can be aligned at a prescribed position. Therefore, external wall construction structure further enhanced in design appearance can be constructed.

It is preferable that the base plate portion has a rib extending along the up-and-down direction. (see claim 4)

In this case, the bending strength of the base plate portion in the up-and-down direction can be enhanced with the rib.

It is possible to control the change in the angle between the first base plate portion and the second base plate portion defined by the first embodiment (claim 1) and the change in the curved shape of the base plate portion defined by the second embodiment (claim 2). As a result, the base plate portion can be fully prevented from being bent such that the lower edge of the second base plate portion is frontwardly lifted up. Thus, the external wall construction structure further enhanced in design appearance can be constructed.

Especially in the fastening member according to the first embodiment, it is preferable to form the rib so as to extend across the boundary between the first base plate portion and the second base plate portion.

In the third embodiment (claim 5) and the fourth embodiment (claim 6), it is preferable that the decorative external panel has an engaging groove for engaging the upper panel engaging portion and an engaging groove for engaging the lower panel engaging portion at upper and lower sides of the decorative external panel, wherein an anteroposterior positional relationship between the decorative surface of the decorative external panel and a rear surface of the engaging groove is the same between adjacent decorative external panels, and wherein the fastening member has a spring portion frontwardly protruded from the base plate portion and configured to come into contact with a rear side surface of the decorative external panel to frontwardly press the decorative external panel.
(See claim 7)

In this case, since the anteroposterior positions of the decorative surfaces of the decorative external panels can be aligned at a prescribed position, the external wall construction structure further enhanced in design appearance can be obtained. That is, the decorative external panel is frontwardly pressed by the spring portion, and therefore the rear surface of the engaging groove comes into contact with the upper panel engaging portion or the lower panel engaging portion of the fastening member. Since the anteroposterior positional relation between the decorative surface of the decorative external panel and the rear surface of the engaging groove is the same between the adjacent decorative external panels, the anteroposterior positions of the decorative surfaces of the decorative external panels coincide with each other between the adjacent decorative external panels.

Here, although the forming position of the engaging groove and the forming position of the decorative surface can be determined with reference to the rear side surface of the decorative external pane, there is a possibility that the anteroposterior position of the decorative surface is misaligned between the adjacent decorative external panels due to the curvature deformation of the decorative external panel and/or the uneven thickness thereof, etc. Therefore, as mentioned above, the anteroposterior positions of the decorative surfaces can be aligned by the spring portion by making the rear surface of the engaging groove serve as a reference. Furthermore, because of the frontward urging of the spring portion, the decorative external panel can be assuredly engaged with the fastening member.

First Embodiment

A fastening member according to this embodiment of the present invention and external wall construction structure 7 constructed using the fastening members will be explained with reference to FIGS. 1 to 10.

The external wall construction structure 7 of this embodiment is constructed for new building, but can also be constructed for remodeling.

Figure 2:
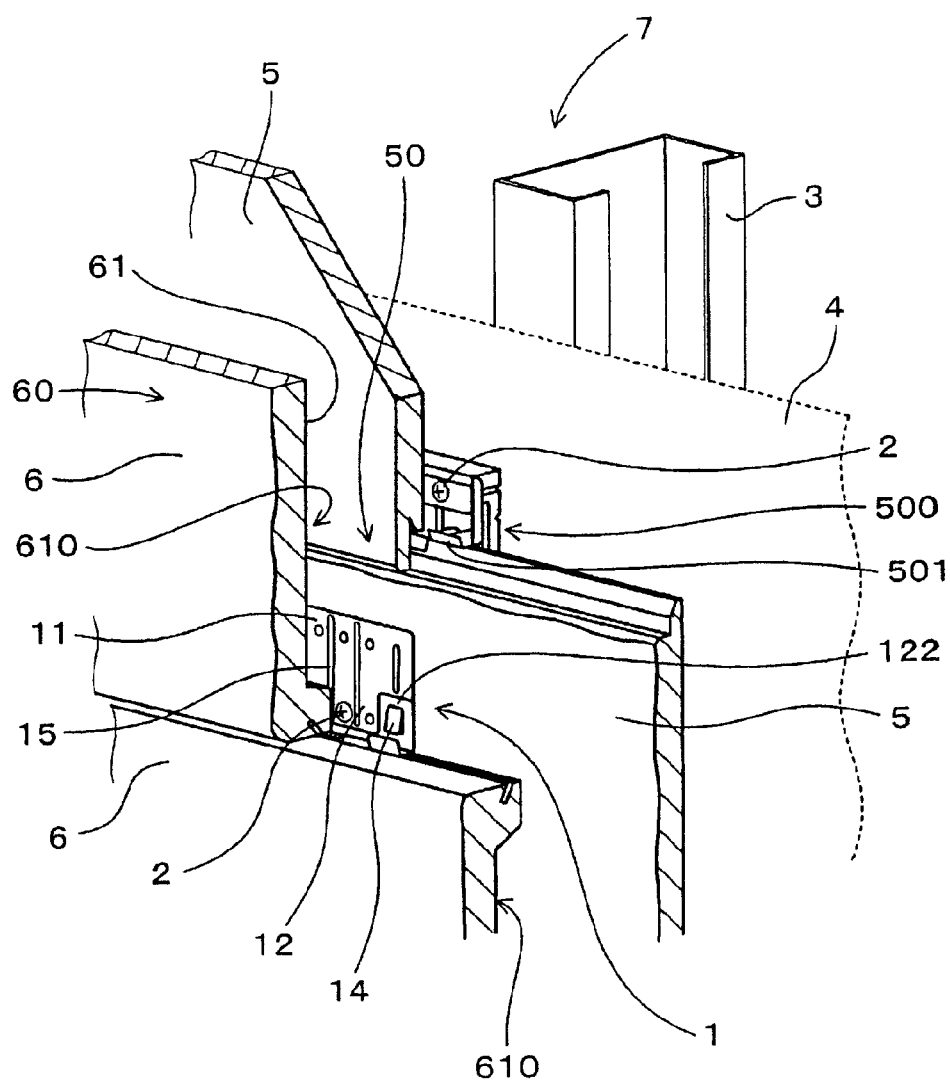
FIG. 2 is an explanatory perspective view showing the external wall construction structure according to the first embodiment.

As shown in FIGS. 1 and 2, the external wall construction structure 7 of this embodiment includes a plurality of underlying panels 5 disposed in front of the construction frame 3 of a building, a plurality of fastening members 1 fastened to the front surfaces of the underlying panels 5, and a plurality of decorative external panels 6 fastened to the underlying panels 5 with the fastening members 1.

Furthermore, as shown in FIGS. 1 to 5, the fastening member 1 has a base plate portion 10 with a rear surface which comes into contact with the underlying panel 5, a supporting portion 13 frontwardly protruded from the base plate portion 10 and configured to support the lower side of the upper decorative external panel 6, an upper panel engaging portion 131 upwardly extended from the front end of the supporting portion 13 and configured to be engaged with the lower side of the upper decorative external panel 6, and a lower panel engaging portion 132 downwardly extended from the front end of the supporting portion 13 and configured to be engaged with the upper side of the lower decorative external panel 6.

Figure 3:
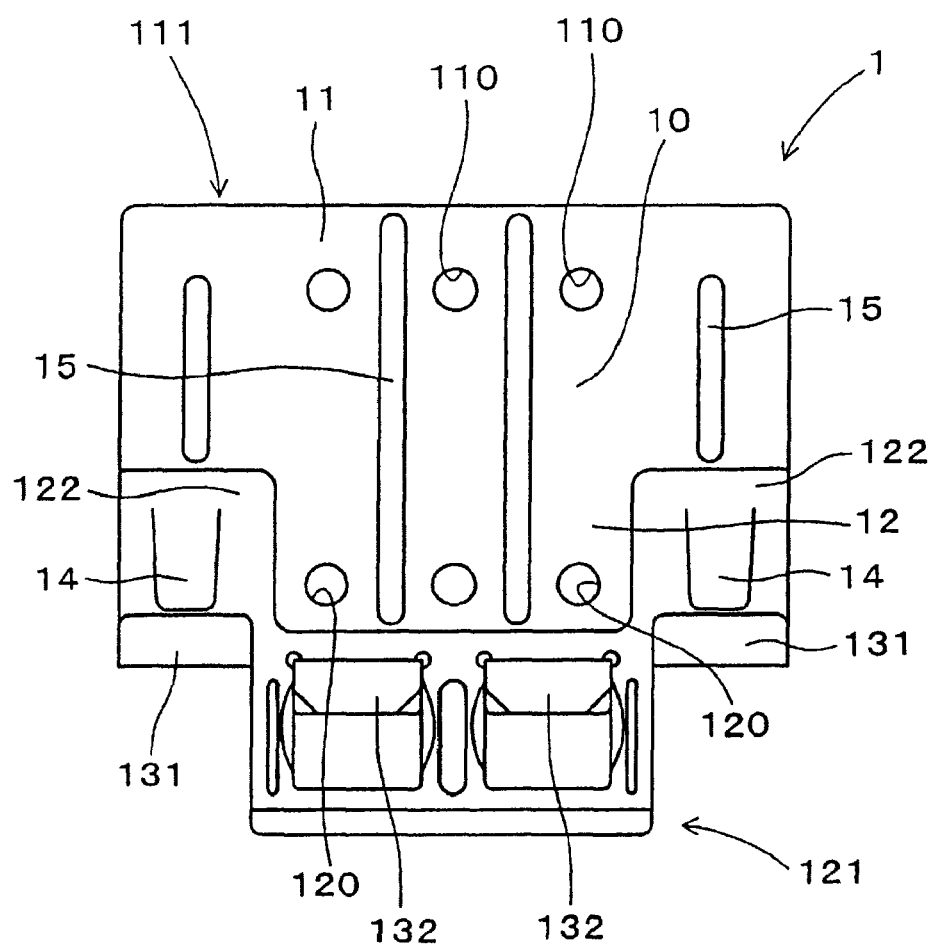
FIG. 3 is a front view showing a fastening member according to the first embodiment.

As shown in FIG. 3, the base plate portion 10 is provided with first screw holes 110 and second screw holes 120 differing in distance from the supporting portion 13 at positions above the supporting portion 13. In this embodiment, the first screw hole 110 and the second screw hole 120 are arranged away from each other by a distance of about 30 mm to about 50 mm in the up-and-down direction.

Figure 9:
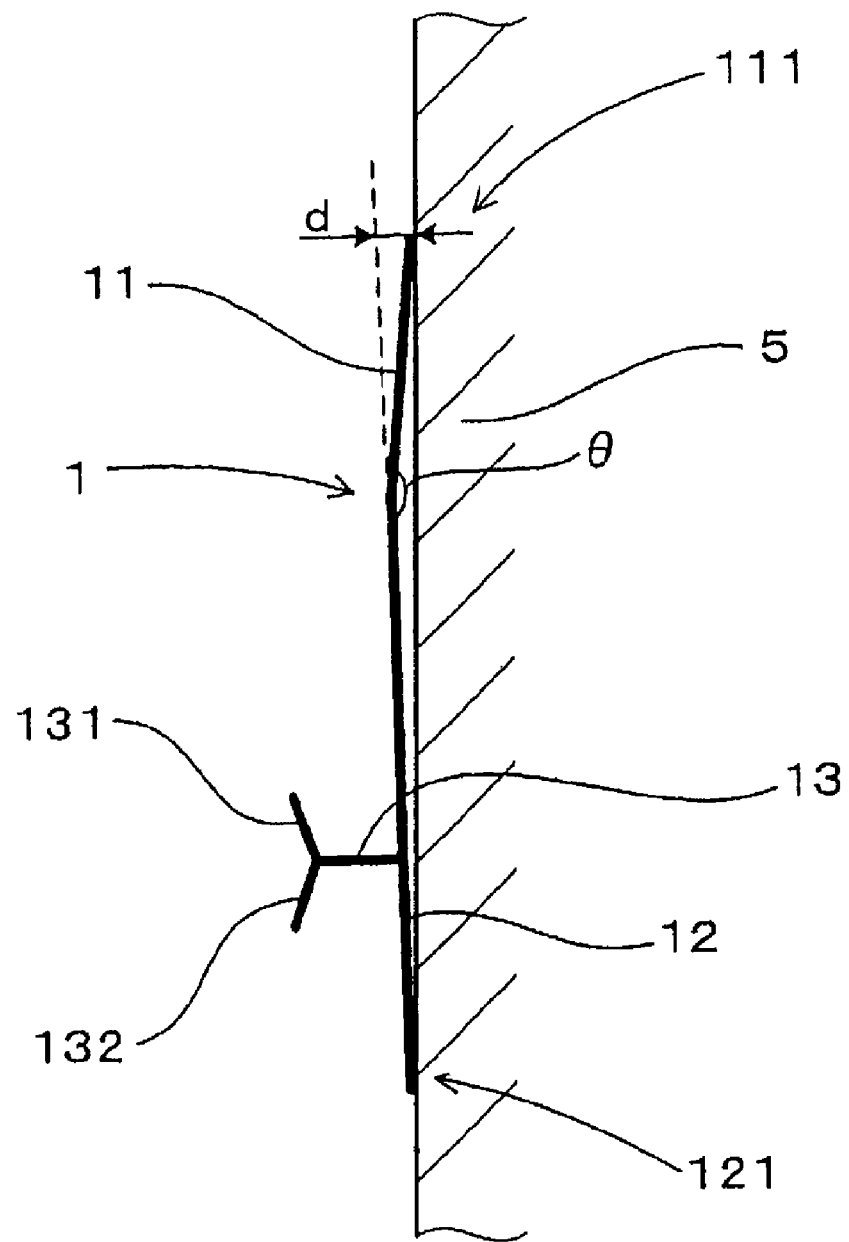
FIG. 9 is a schematic cross-sectional view showing a configuration of a fastening member according to the first embodiment.

As shown in FIG. 9, the first base plate portion 11 of the base plate portion 10 in which the first screw hole 110 farther away from the supporting portion 13 is formed and the second base plate portion 12 in which the second screw hole 120 closer to the supporting portion 13 is formed form an obtuse angle θ of about 176° to abut 178°.

Figure 5:
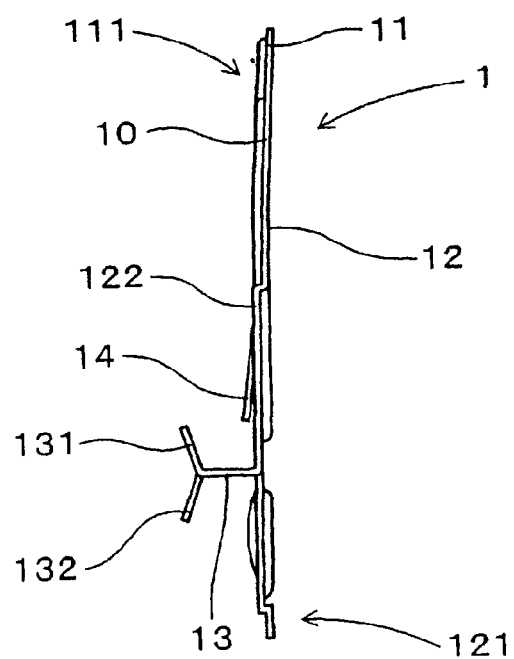
FIG. 5 is a side view showing the fastening member according to the first embodiment.

As shown in FIGS. 1, 5 and 9, the first base plate portion 11 and the second base plate portion 12 are inclined mutually such that the first base plate portion 11 is inclined rearward with respect to the second base plate portion 12 toward the upper side of the first base plate portion 11. In this embodiment, as shown in FIG. 9, the distance "d" by which the upper edge 111 of the first base plate portion 11 is retreated with respect to the plane including the second base plate portion 12 is 0.5 mm to 2 mm.

The fastening member 1 is fastened to the underlying panel 5 with a screw 2 screwed into the underlying panel 5 via either the first screw hole 110 or the second screw hole 120.

The first screw hole 110 and the second screw hole 120 are formed at three portions arranged in the right and left direction, respectively.

As shown in FIGS. 2, 3 and 5, the second base plate portion 12 has frontwardly bulged portions 122 partially bulged frontward more than the thickness of the screw head of the screw 2. The frontwardly bulged portion 122 is provided with a spring portion 14 protruded frontward. This spring portion 14 frontwardly presses the decorative external panel 6 by coming into contact with the rear side surface 61 of the decorative external panel 6 while being urged forwardly.

Figure 4:
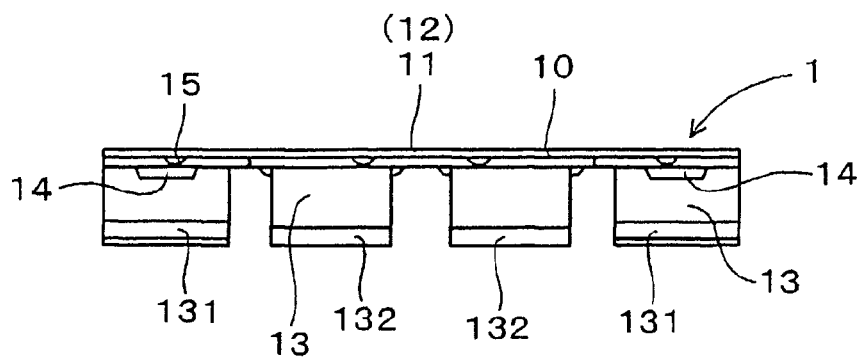
FIG. 4 is a top view showing the fastening member according to the first embodiment.

As shown in FIGS. 3 to 5, the base plate portion 10 has ribs 15 each extending in the up-and-down direction so as to cross the first base plate portion 11 and the second base plate portion 12. In this embodiment, a total of four ribs 15 are formed in a frontwardly protruded manner.

In this embodiment, as the material of the fastening member 1, a stainless steel plate having a thickness of 0.8 mm is used.

The underlying panel 5 is made of ceramic series material, and has a dimension of, for example, a length of 455 mm, a width of 3,030 mm, and a thickness of 16 mm.

The decorative external panel 6 is made of ceramic series material. The decorative external panel 6 is smaller than the underlying panel 5 in vertical and horizontal dimensions, and has a dimension of, for example, a length of 220 mm, a width of 455 mm and a thickness of 35 mm.

As shown in FIGS. 1 and 2, in the decorative external panel 6, a dented portion 610 is formed at the central portion of the rear side surface 61 except for the upper side portion, the lower side portion, the left side portion, and the right side portion.

As shown in FIG. 1, the decorative external panel 6 has engaging grooves 600 to be engaged with the upper panel engaging portion 131 and the lower panel engaging portion 132. The anteroposterior positional relation between the decorative surface 60 of the decorative external panel 6 and the rear surface 601 of the engaging groove 600 is constituted to be the same between the adjacent decorative external panels 6.

Next, the construction procedure of the external wall construction structure 7 of this embodiment will be explained.

Figure 6:
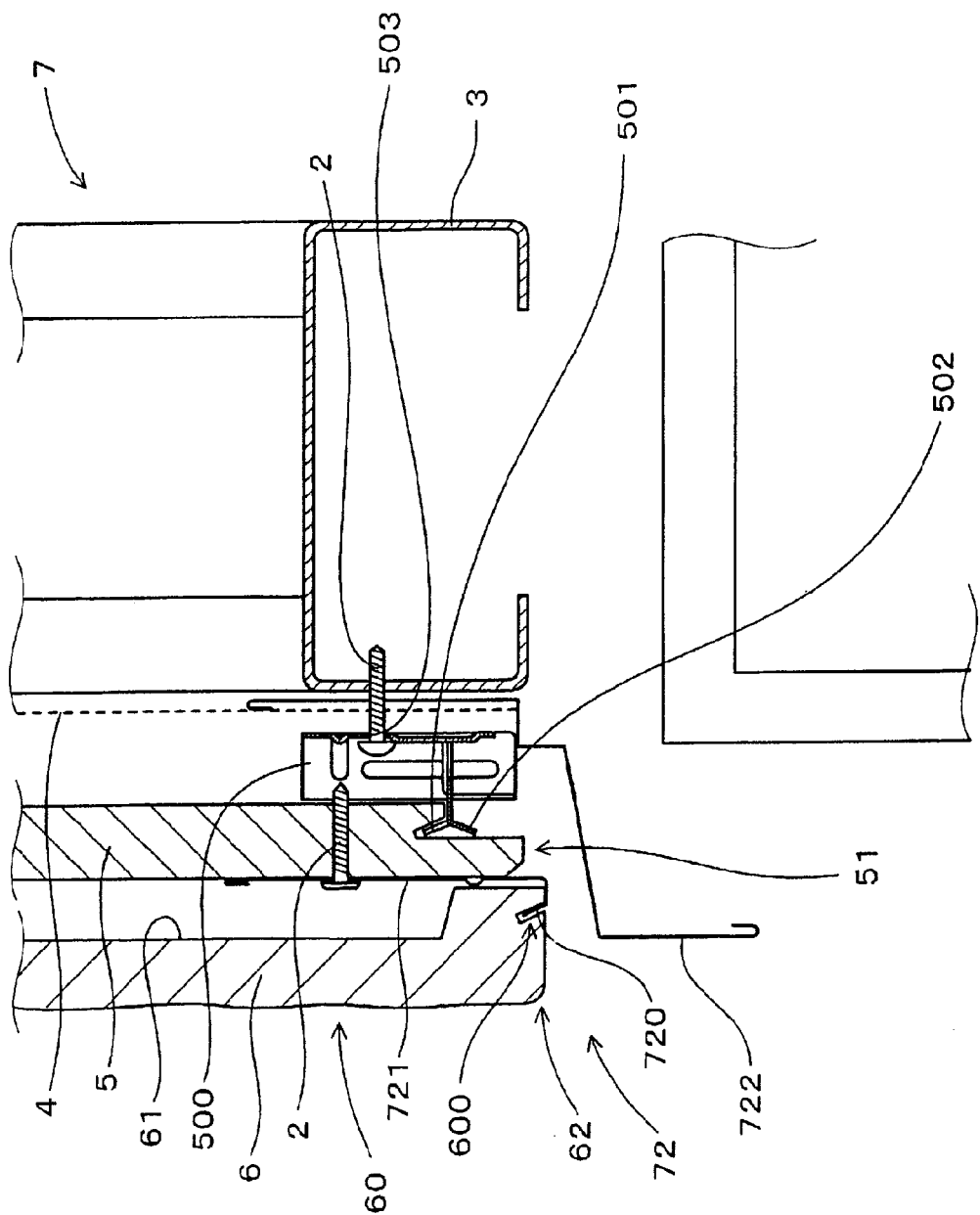
FIG. 6 is a cross-sectional explanatory view showing the external wall construction structure around a sill according to the first embodiment.
Figure 7:
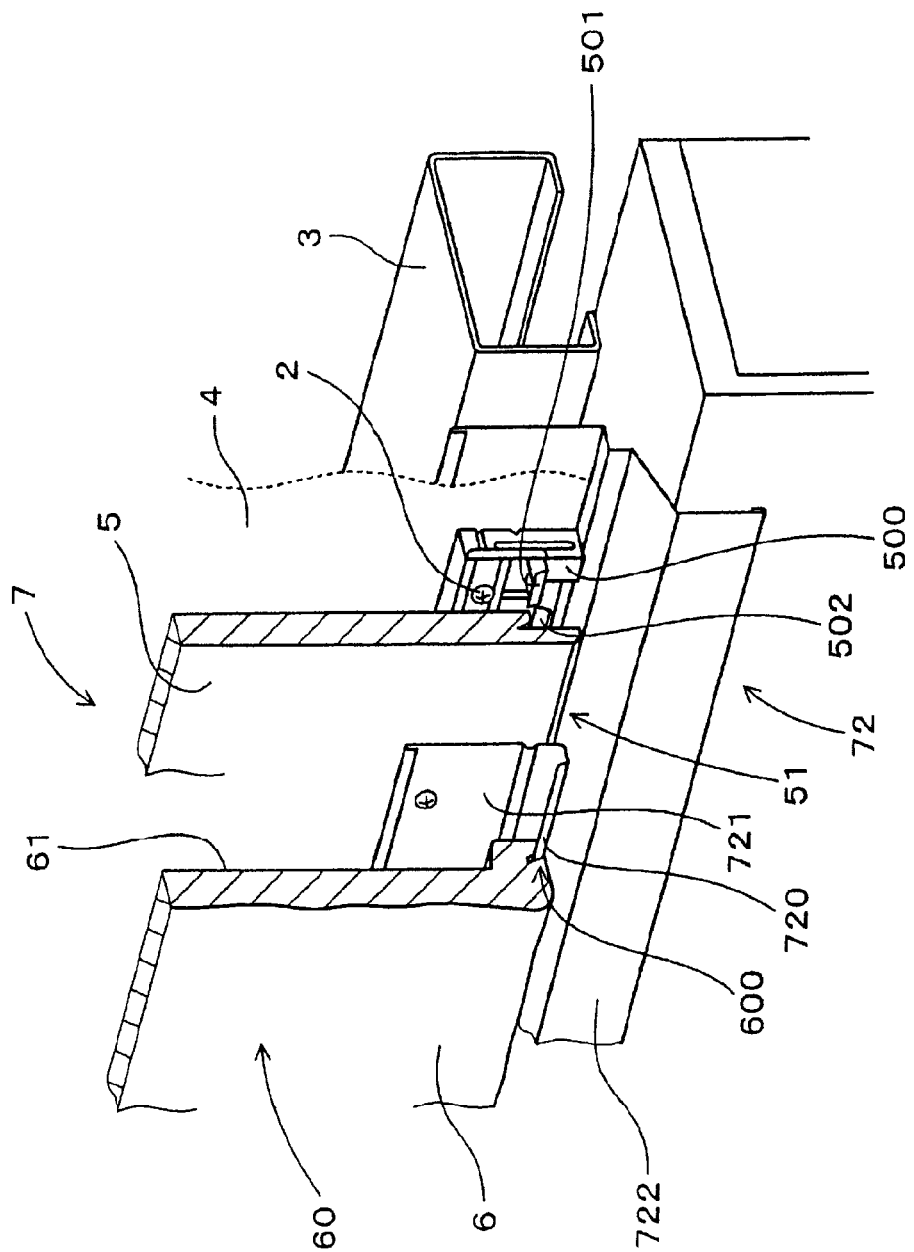
FIG. 7 is an explanatory perspective view showing the external wall construction structure around the sill according to the first embodiment.
Figure 10:
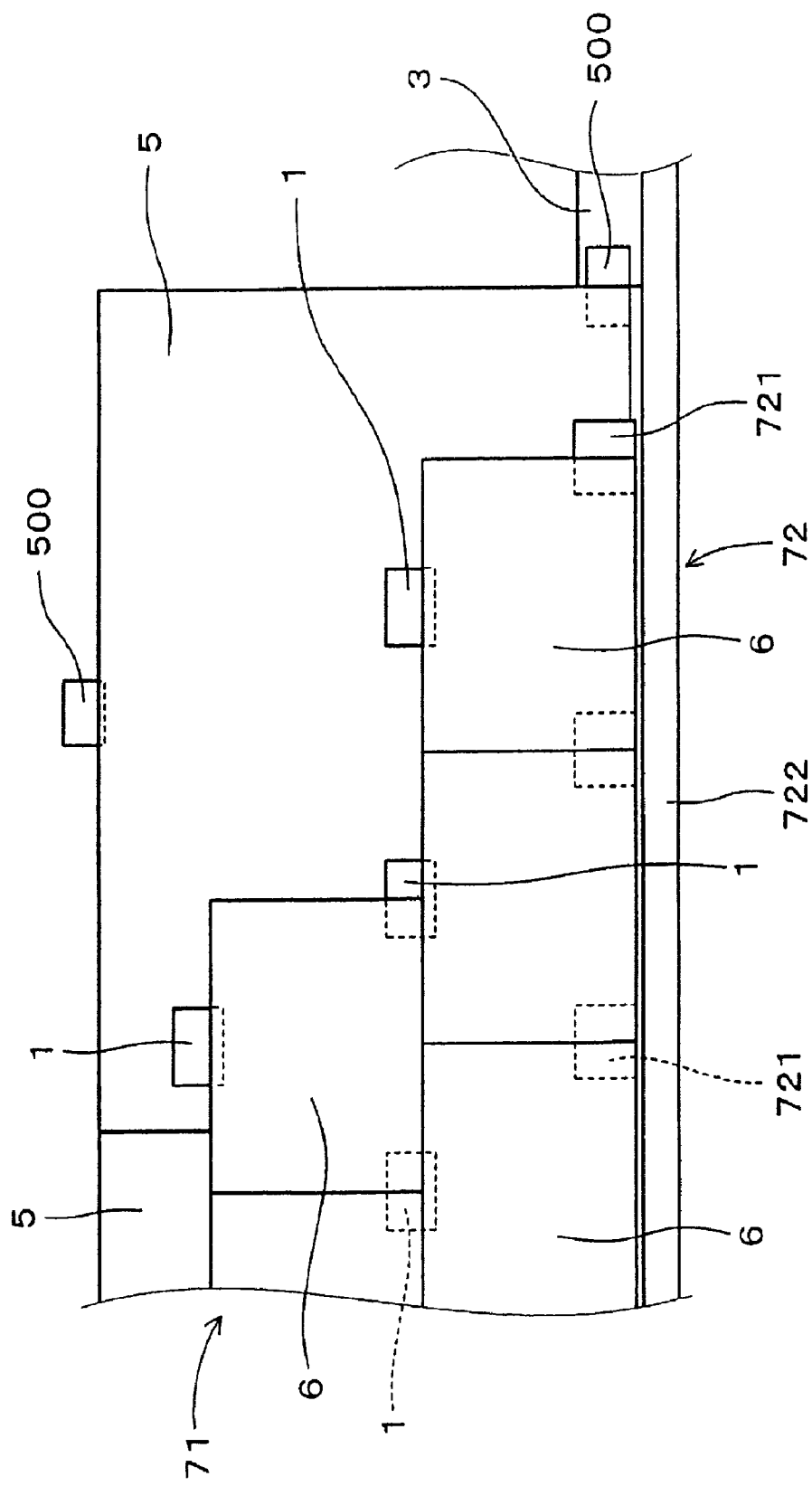
FIG. 10 is an explanatory structural view showing the external wall construction structure according to the first embodiment.

First, as shown in FIGS. 6, 7 and 10, at the base portion 72, an underlying panel fastening member 500 is fastened to the construction frame 3 of C-shaped steel from the front side with a sill throating 722 and a sheathing paper 4 disposed therebetween. Then, the lower side of the right-and-left end portion of the underlying panel 5 is engaged with the upper panel engaging portion 501 of the underlying panel fastening member 500. Thereafter, as shown in FIG. 10, an underlying panel fastening member 500 is disposed on the upper side of the underlying panel 5 by sliding from the above to thereby engage the lower panel engaging portion 502 with the upper side of the underlying panel 5. Then, the underlying panel 5 is fastened to the construction frame 3 with a screw 2 inserted in the screw hole 503 of the underlying panel fastening member 500.

Furthermore, as shown in FIGS. 1, 2, and 10, the lower side of the underlying panel 5 to be disposed is engaged with the upper panel engaging portion 501 of the underlying panel fastening member 500. Thereafter, as shown in FIG. 10, an underlying panel fastening member 500 is disposed on the upper side of the underlying panel 5 by sliding from the above to thereby engage the lower panel engaging portion 502 with the upper side of the underlying panel 5. Then, the underlying panel 5 is fastened to the construction frame 3 with a screw 2 inserted in the screw hole 503 of the underlying panel fastening member 500. By successively repeating the aforementioned procedures, the underlying panels 5 can be fastened to the construction frame 3 at the intermediate portion 71.

Next, the decorative external panels 6 are fastened to the front surfaces of the underlying panels 5. That is, as shown in FIGS. 6, 7, and 10, a starter member 721 is fastened to the front surface of the lower edge 51 of the lowermost underlying panel 5, and the engaging portion 720 of the starter member 721 is engaged with the engaging groove 600 of the lower side of the right-and-left end portion of the decorative external panel 6. Subsequently, as shown in FIG. 10, a fastening member 1 is disposed at the central portion of the rear side surface 61 of the upper side of the decorative external panel 6 by sliding from the above to thereby engage the lower panel engaging portion 132 of the fastening member 1 with the engaging groove 600 of the upper side of the decorative external panel 6. Then, a screw 2 is inserted into either the first screw hole 110 or the second screw hole 120 of a fastening member 1 to fasten the decorative external panel 6 to the underlying panel 5.

In this embodiment, as shown in FIG. 6, the lower end portion 62 of the lowermost decorative external panel 6 is positioned lower than the lower end portion 51 of the underlying panel 5 by about 5 mm. This makes the lower end portion 62 of the decorative external panel 6 serve as an underthroating, which in turn makes it possible to prevent the rain water flowed down the decorative surfaces 60 of the upper decorative external panels 6 from entering into the rear side of the decorative external panel 6.

Furthermore, as shown in FIGS. 1, 2, and 10, the engaging groove 600 of the right-and-left end portion of the lower side of the decorative external panel 6 is made to be engaged with the upper panel engaging portion 131 of the fastening member 1 engaged with the lower decorative external panel 6. Subsequently, as shown in FIG. 10, a fastening member 1 is disposed at the central portion of the rear side surface 61 of the upper side of the decorative external panel 6 by sliding from the above, to thereby engage the lower panel engaging portion 132 of the fastening member 1 with the engaging groove 600 of the upper side of the decorative external panel 6. Then, a screw 2 is inserted into either the first screw hole 110 or the second screw hole 120 of the fastening member 1 to fasten the decorative external panel 6 to the underlying panel 5. By successively repeating the aforementioned procedures, a plurality of decorative external panels 6 can be fastened to the underlying panels 5 to thereby construct the external wall construction structure 7.

As explained above, by fastening a plurality of decorative external panels 6 to the underlying panels 5 using the fastening members 1, the fastening members 1 will be fastened to various positions of the underlying panels 5. In fastening the fastening members 1 to the underlying panels 5, as shown in FIG. 8, screw holes to be used differ depending on the position of the fastening member 1 to the underlying panel 5.

Figure 8:
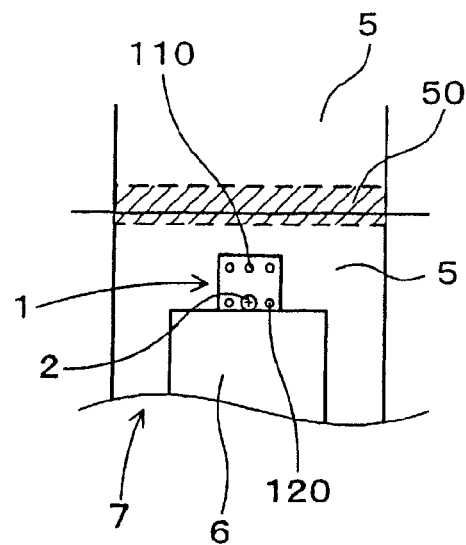
FIG. 8(a) is an explanatory view showing a screw fixing method in cases where a first screw hole and a second screw hole are away from the end portion of the underlying panel according to the first embodiment.
FIG. 8(b) is an explanatory view showing a screw fixing method in cases where the first screw hole is positioned at the vicinity of the end portion of the underlying panel according to the first embodiment.
FIG. 8(c) is an explanatory view showing a screw fixing method in cases where the second screw hole is positioned at the vicinity of the end portion of the underlying panel according to the first embodiment.
FIG. 8(d) is an explanatory view showing a screw fixing method in cases where a fastening member is positioned at the vicinity of the end portion of the underlying panel according to the first embodiment.
Figure 8:
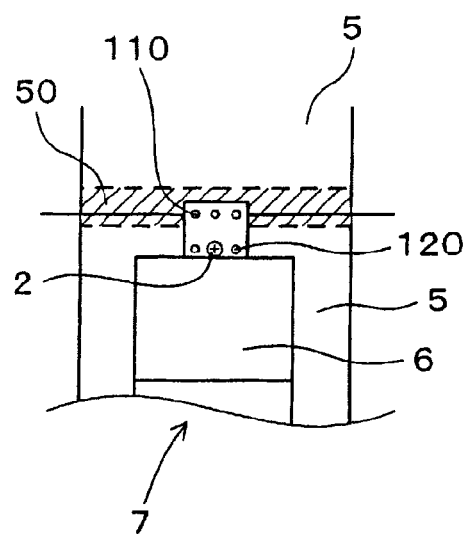
Figure 8:
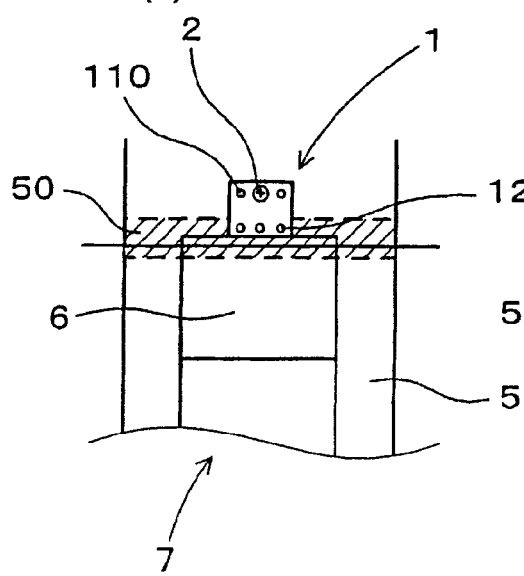
Figure 8:
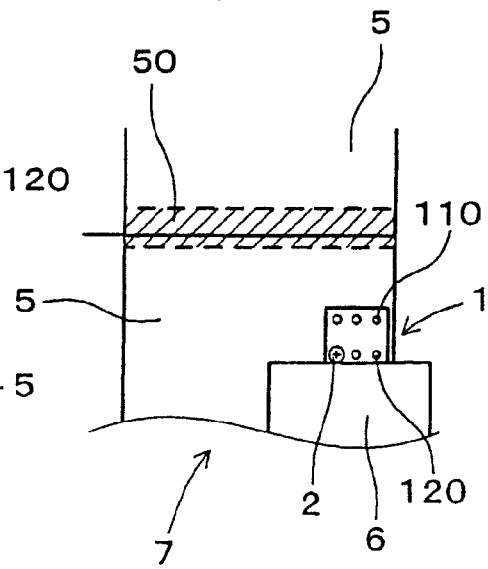

That is, as shown in FIG. 8(*a*), in cases where the vertical position of the fastening member 1 and the vertical position of the end portion 50 of the underlying panel 5 are separated sufficiently, although it is possible to insert a screw 2 into the first screw hole 110, it is more preferable to insert the screw 2 into the second screw hole 120 from the viewpoint of the fastening strength.

Next, as shown in FIG. 8(*b*), in cases where the first screw hole 110 is positioned at the end portion 50 of the underlying panel 5, screwing of a screw 2 through the first screw hole 110 may cause cracking and/or breaking of the end portion 50 of the underlying panel 5. In this case, the screwing of the screw 2 through the second screw hole 120 can prevent occurrence of cracking and/or breaking of the end portion 50 of the underlying panel 5.

On the other hand, as shown in FIG. 8(*c*), in cases where the second screw hole 120 is positioned at the end portion 50 of the underlying panel 5, the screwing of the screw 2 through the first screw hole 110 can prevent occurrence of cracking and/or breaking of the end portion 50 of the underlying panel 5.

Furthermore, as shown in FIG. 8(*d*), in cases where the fastening member 1 is positioned near the right-and-left end portion of the underlying panel 5, a screw 2 can be inserted into either the first screw hole 110 or the second screw hole 120 the most farther away from the right-and-left end portion of the underlying panel 5. In this embodiment, the screw 2 is inserted into the second screw hole 120 located at the left end side.

In addition, the hatched portion in FIG. 8 denotes an end portion 50 of the underlying panel 5 where cracking and/or breaking tends to occur. The range of the end portion 50 can be defined as follows for example. That is, as shown in FIG. 1, with reference to the joint portion 52 of the adjacent upper and lower underlying panels 5 as seen from the front, the end portion 50 ranges from the position 10 mm below the joint portion to the position 30 mm above the joint portion.

Next, effects and functions of this embodiment will be explained.

As shown in FIGS. 1 to 3, the base plate portion 10 of the fastening member 1 is provided with the first screw hole 110 and the second screw hole 120 differing in distance from the supporting portion 13. With this, in cases where the fastening member 1 is disposed at the vicinity of the joint portion 52 of the upper and lower underlying panels 5, a screw 2 can be inserted into one of the first screw hole 110 and the second screw hole 120 farther away from the end portion 50 of the underlying panel 5. That is, according to the fastening member 1, it is possible to avoid that a screw 2 is screwed into the end portion 50 of the underlying panel 5, thereby causing no cracking and/or breaking of the underlying panel 5, which results in external wall construction structure 7 excellent in strength of fastening decorative external panels 6.

Furthermore, as shown in FIG. 1, the first base plate portion 11 is inclined to the second base plate portion 12 toward the upper side of the first base plate portion 11. Thereby, when a screw 2 is inserted into either the first screw hole 110 or the second screw hole 120 to fasten the fastening member 1 to the underlying panel 5, the upper edge 111 of the first base plate portion 11 and the lower edge 121 of the second base plate portion 12 can be brought into contact with the underlying panel 5 assuredly. With this, the upper panel engaging portion 131 and the lower panel engaging portion 132 of the second base plate portion 12 will be assuredly held near the front surface of the underlying panel 5.

Therefore, as shown in FIG. 1, the lower side and the upper side of the decorative external panel 6 engaged with the upper panel engaging portion 131 and the lower panel engaging portion 131 of the fastening member 1 respectively can be assuredly held near the front surface of the underlying panel 5. Thus, it becomes possible to prevent occurrence of unevenness on the decorative surfaces 60 of the external wall construction structure 7 constituted by a plurality of the decorative external panels 6, resulting in external wall construction structure 7 excellent in design appearance.

In a state in which a screw 2 is inserted into the first screw hole 110 to fasten the fastening member 1 to the underlying panel 5, the upper or lower side of the decorative external panel 6 engaged with the fastening member 1 may cause a force of frontwardly pulling the second base plate portion 12. As mentioned above, however, the first base plate portion 11 is inclined rearward to the second base plate portion 12 toward the upper side of the first base plate portion 11. In other words, the second base plate portion 12 is inclined rearward to the first base plate portion 11 toward the lower side of the second base plate portion 12.

Therefore, as mentioned above, even if a force of frontwardly pulling the second base plate portion 12 is applied, the fastening member 1 will not be bent such that the lower edge 121 of the second base plate portion 12 is frontwardly lifted up. Consequently, even in cases where a screw 2 is inserted into the first screw hole 110 to fasten the fastening member 1 to the underlying panel 5, it is possible to prevent occurrence of unevenness on the decorative surfaces 60 of the plurality of the decorative external panels 6.

Furthermore, as shown in FIGS. 1 to 5, since the base plate portion 10 has ribs 15 formed along the up-and-down direction so as to cross the first base plate portion 11 and the second base plate portion 12, external wall construction structure 7 further enhanced in design appearance can be obtained. That is, the bending strength of the base plate is portion 10 in the up-and-down direction can be enhanced with the ribs 15. Thus, even in cases where the fastening member 1 supports the decorative external panel 6, it is possible to restrain the changing of the angle between the first base plate portion 11 and the second base plate portion 12. Therefore, it is possible to prevent the fastening member 1 from being bent in such a manner that the lower edge 121 of the second base plate portion 12 is frontwardly lifted up, resulting in external wall construction structure 7 further enhanced in design appearance.

Furthermore, as shown in FIGS. 1 to 5, the base plate portion 1 has a spring portion 14 frontwardly protruded from the base plate portion 10 and configured to come into contact with a rear side surface 61 of the decorative external panel 6 to frontwardly press the decorative external panel 6. With this, the anteroposterior positions of the decorative surfaces 60 of the decorative external panels 6 can be aligned at a prescribed position. Therefore, external wall construction structure 7 further enhanced in design appearance can be constructed.

That is, as shown in FIG. 1, the decorative external panel 6 is frontwardly pressed by the spring portion 14, and therefore the rear surface 601 of the engaging groove 600 comes into contact with the upper panel engaging portion 131 or the lower panel engaging portion 132 of the fastening member 1. Since the anteroposterior positional relation between the decorative surface 60 of the decorative external panel 6 and the rear surface 601 of the engaging groove 600 is the same between the adjacent decorative external panels 6, the anteroposterior positions of the adjacent decorative surfaces 60 of the decorative external panels 6 coincide with each other.

Here, although the forming position of the engaging groove 600 and the forming position of the decorative surface 60 can be determined with reference to the rear side surface 61 of the decorative external pane 6, there is a possibility that the anteroposterior positions of the decorative surfaces 60 are misaligned between the adjacent decorative external panels 6 due to the curvature deformation of the decorative external panel 6 and/or the uneven thickness thereof, etc. Therefore, as mentioned above, the anteroposterior positions of the decorative surfaces 60 can be aligned by the spring portion 14 by making the rear surface 601 of the engaging groove 600 serve as a reference.

Furthermore, because of the frontward urging of the spring portion 14, the decorative external panel 6 can be assuredly engaged with the fastening member 1.

As discussed above, according to this embodiment, a fastening member 1 excellent in strength of fastening a decorative external panel 6 and capable of constructing an external wall surface excellent in design appearance and external wall construction structure 7 using the fastening member 1 can be obtained.

Second Embodiment

Figure 11:
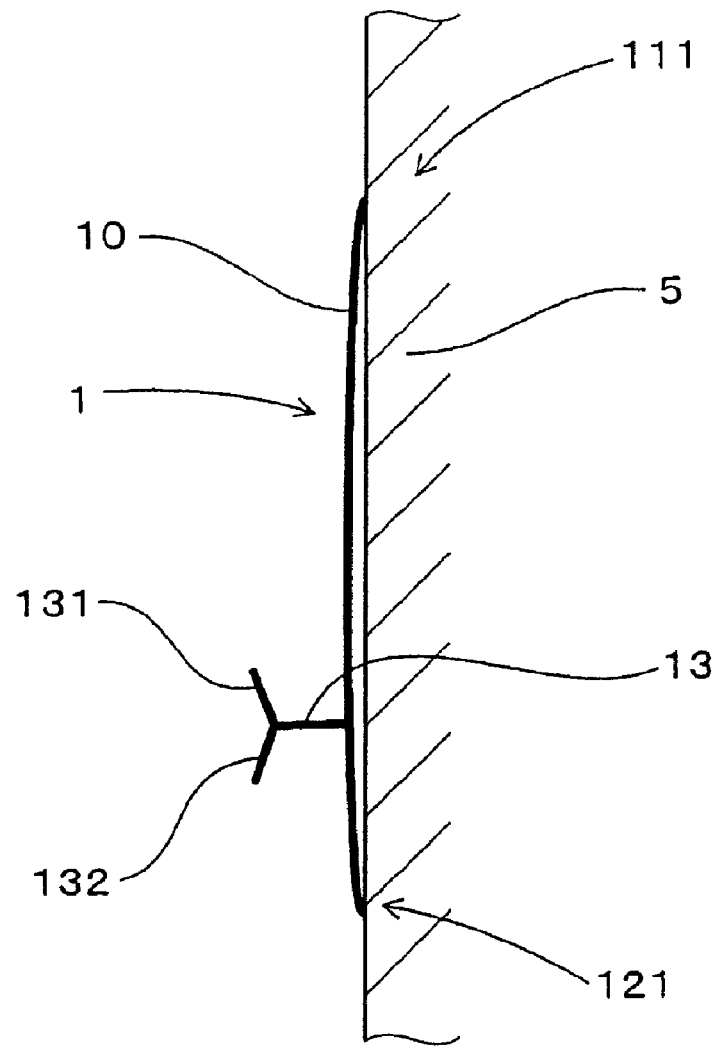
FIG. 11 is a schematic cross-sectional view showing a configuration of a fastening member according to a second embodiment.

As shown in FIG. 11, in the fastening member 1 of this embodiment, the base plate portion 10 is circularly curved in the up-and-down direction so that the upper edge 111 and the lower edge 121 of the base plate portion 10 are located rearward with respect to the other portion of the base plate portion 10. In this embodiment, the upper edge 111 and the lower edge 121 of the base plate portion 10 are located rearward by, e.g., about 0.5 mm to about 1.5 mm with respect to the most frontwardly positioned portion of the base plate portion 10. The other structure is the same as that of the first embodiment.

In this second embodiment, since the base plate portion 10 is curved as mentioned above, in the same manner as in the first embodiment, it becomes possible to prevent occurrence of unevenness on the decorative surface 60 of the external wall construction structure 7 constituted by a plurality of the decorative external panels 6, thereby resulting in external wall construction structure 7 excellent in design appearance.

Furthermore, even in cases where a screw 2 is inserted into the first screw hole 110 to fasten the fastening member 1 to the underlying panel 5, it is possible to prevent occurrence of unevenness on the decorative surfaces 60 of the plurality of the decorative external panels 6.

Other than the above, the same or similar functions and effects of the first embodiment can be attained.

COMPARATIVE EXAMPLE

Figure 12:
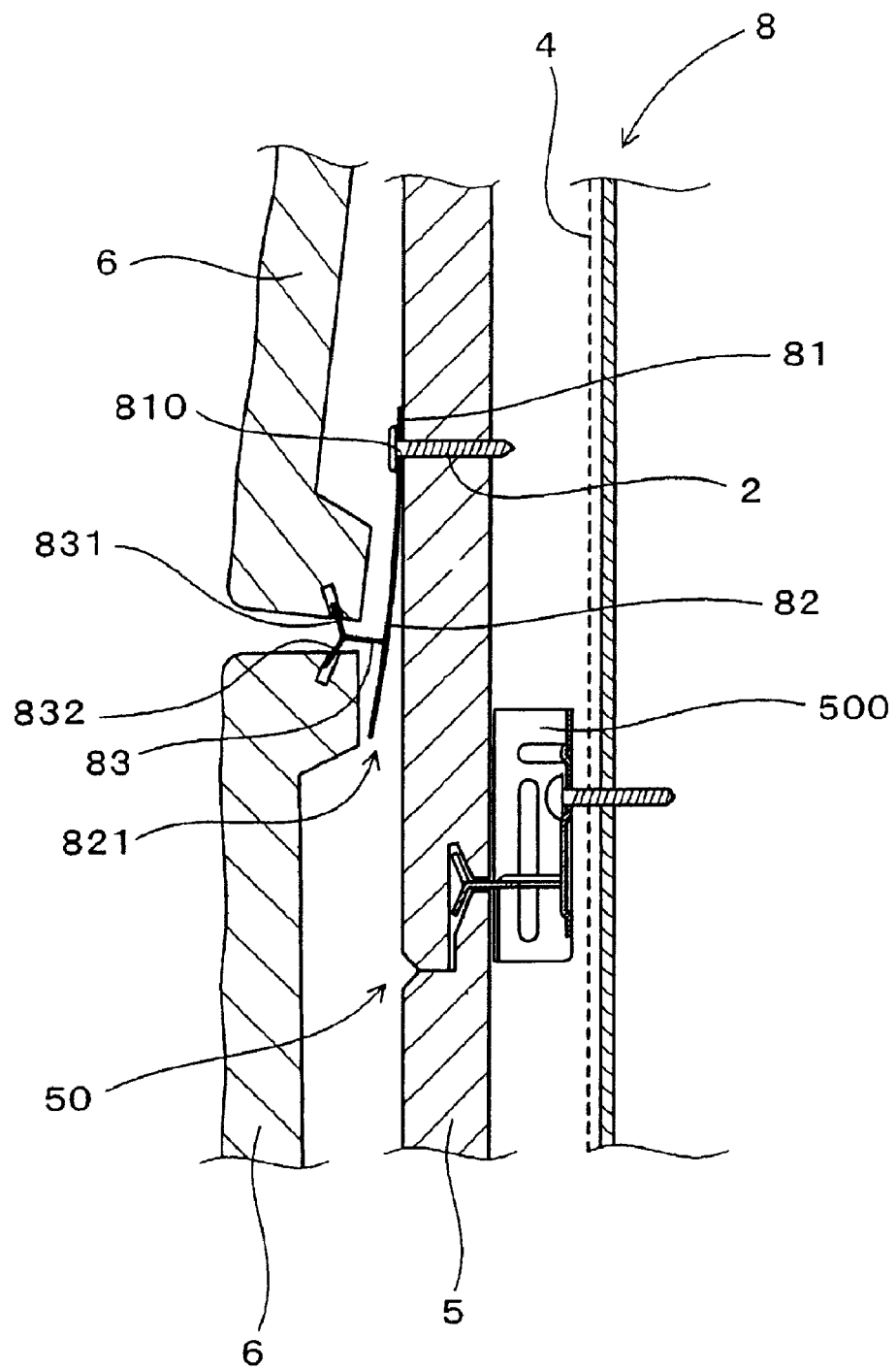
FIG. 12 is a cross-sectional explanatory view showing external wall construction structure according to a comparative embodiment.
Figure 13:
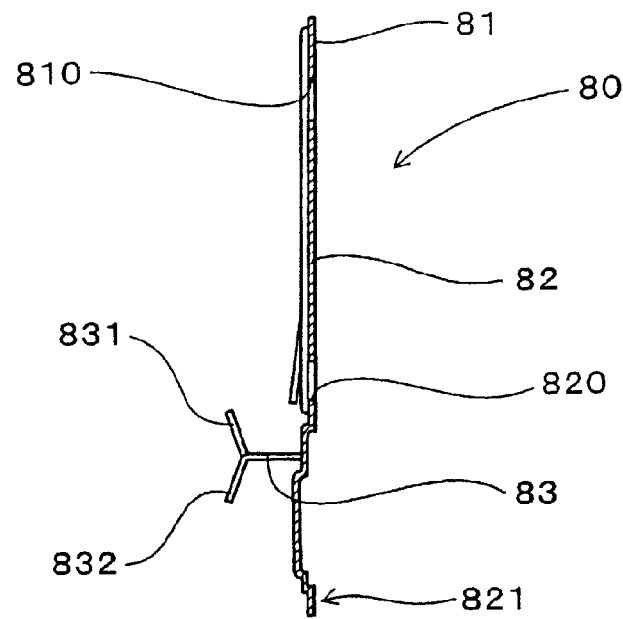
FIG. 13 is a cross-sectional explanatory view showing the fastening member according to the comparative embodiment.
Figure 14:
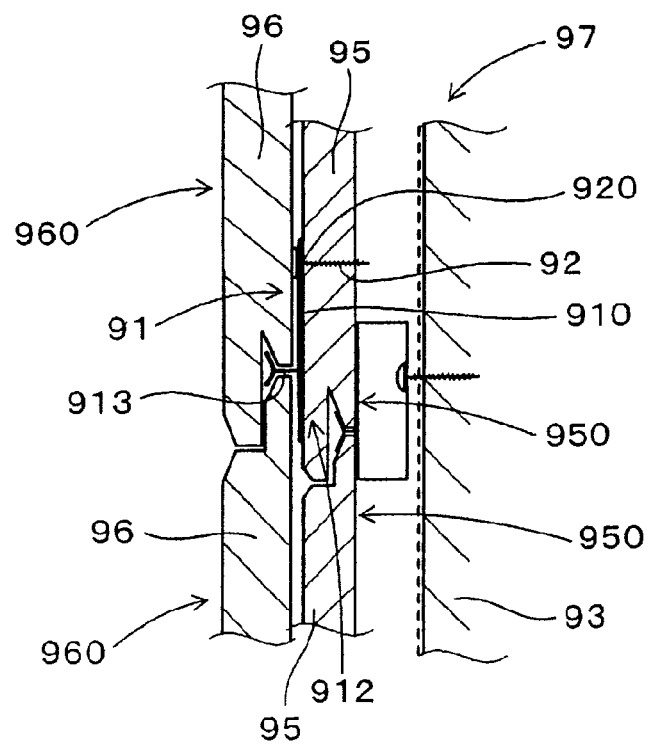
FIG. 14 is a cross-sectional explanatory view showing conventional external wall construction structure.

In the fastening member of this comparative embodiment, as shown in FIGS. 12 and 13, the first base plate portion 81 provided with the first screw hole 810 and the second base plate portion 82 provided with the second screw hole 820 are not inclined mutually, and are formed into a flat shape. The other structure is the same as that of the first embodiment.

In cases where the decorative external panel 6 is fastened to the underlying panel using the fastening member 80 of this comparative embodiment, depending on the construction method and/or the condition of the underlying panel 5, in some cases, the upper edge and the lower edge of the fastening member 80 cannot be assuredly brought into contact with the front surface of the underlying panel 5. As a result, there is a possibility that the lower side or the upper side of the decorative external panel 6 engaged with the upper panel engaging portion 831 or the lower panel engaging portion 832 is frontwardly lifted up.

As shown in FIGS. 12 and 13, especially, in cases where the fastening member 80 is fastened to the underlying panel 5 with a screw 2 inserted in the first screw hole 810 located farther away from the supporting portion 83, when a force of frontwardly pulling the upper panel engaging portion 831 and the lower panel engaging portion 832 of the fastening member 80 acts, the lower edge 821 of the second base plate portion 82 may be frontwardly lifted up. Consequently, there is a possibility that the upper side or the lower side of the decorative external member 6 are frontwardly lifted up.

As a result, as shown in FIG. 12, the anteroposterior positions of the decorative surfaces 60 of the adjacent decorative external panels 6 will not be aligned to thereby cause unevenness, which may cause a deterioration of the design appearance of the external wall construction structure 8. To the contrary, according to the external wall construction structure 7 of the present invention, as mentioned above, it is possible to prevent the anteroposterior positions of the decorative surface 60 of the decorative external panels 6 from being misaligned, thereby resulting in an external wall surface excellent in design appearance.

What is claimed is:

1. A fastening member for fastening a plurality of decorative external panels to underlying panels at the time of disposing the plurality of decorative external panels in front of a plurality of underlying panels disposed in front of a construction frame of a building, the fastening member, comprising:

a base plate having an upper edge, a lower edge and a rear surface which comes into contact with the underlying panel;

a plurality of supporting portions all aligned in a plane and frontwardly protruded from the base plate and configured to support a lower side of an upper side decorative external panel;

an upper panel engaging portion upwardly extended from a front end of the supporting portions at opposite respective edges of the base plate and configured to be engaged with a lower side of the upper side decorative external panel; and a lower panel engaging portion downwardly extended from the front end of the supporting portions formed between the supporting portions at the opposite respective edges of the base plate and configured to be engaged with an upper side of a lower side decorative external panel, the base plate having a first screw hole and a second screw hole differing in distance from the supporting portions, the first screw hole and the second screw hole being located above the supporting portions, the base plate having a spring portion frontwardly protruded from the base plate so as to increasingly separate from a plane of the base plate in a downward direction and configured to come into contact with a rear side surface of the decorative external panel to frontwardly press the decorative external panel, wherein a first base plate portion of the base plate in which the first screw hole farther away from the supporting portion is formed and a second base plate portion of the base plate in which the second screw hole closer to the supporting portion is formed, forming an obtuse angle between the first base plate portion and the second base plate portion, the first base plate portion having an upper edge defined by the upper edge of the base plate and the second base plate portion having a lower edge defined by the lower edge of the base plate;

wherein the first base plate portion is inclined rearward with respect to the second base portion toward an upper side of the first base plate portion, and wherein when a screw is inserted into either the first screw hole or the second screw hole to fasten the fastening member to the underlying panel, the upper edge of the first base plate portion and the lower edge of the second base plate portion can be brought into contact with the underlying panel assuredly.

2. The fastening member as recited in claim 1, wherein the base plate portion has a frontwardly protruded rib extending along the up-and-down direction.

3. A fastening member for fastening a plurality of decorative external panels to underlying panels at the time of disposing the plurality of decorative external panels in front of a plurality of underlying panels disposed in front of a construction frame of a building, the fastening member comprising:
 a base plate having an upper edge, a lower edge and a rear surface which comes into contact with the underlying panel;
 a plurality of supporting portions all aligned in a plane and frontwardly protruded from the base plate and configured to support a lower side of an upper side decorative external panel;
 an upper panel engaging portion upwardly extended from a front end of the supporting portions at opposite respective edges of the base plate and configured to be engaged with a lower side of the upper side decorative external panel; and
 a lower panel engaging portion downwardly extended from the front end of the supporting portions formed between the supporting portions at the opposite respective edges of the base plate and configured to be engaged with an upper side of a lower side decorative external panel,
 the base plate having a first screw hole and a second screw hole differing in distance from the supporting portions, the first screw hole and the second screw hole being located above the supporting portions, the base plate having a spring portion frontwardly protruded from the base plate so as to increasingly separate from a plane of the base plate in a downward direction and configured to come into contact with a rear side surface of the decorative external panel to frontwardly press the decorative external panel,
 wherein the base plate is curved in an up-and-down direction such that the upper edge and the lower edge of the base plate are located rearward of a first base plate portion and a second base portion located between the upper and lower edges of the base plate, wherein the first base plate portion has an upper edge defined by the upper edge of the base plate and the second base plate portion has a lower edge defined by the lower edge of the base plate, and
 wherein when a screw is inserted into either the first screw hole or the second screw hole to fasten the fastening member to the underlying panel, the upper edge of the first base plate portion and the lower edge of the second base plate portion can be brought into contact with the underlying panel assuredly.

4. The fastening member as recited in claim 3, wherein the base plate portion has a rib extending along the up-and-down direction.

5. External wall construction structure, comprising:
 a plurality of underlying panels disposed in front of a construction frame of a building; a plurality of fastening members fastened to a front surface of the underlying panel; and a plurality of decorative external panels fastened to the underlying panels with the fastening members,
 wherein the fastening member includes:
 a base plate having an upper edge, a lower edge and a rear surface which comes into contact with the underlying panel;
 a plurality of supporting portions all aligned in a plane and frontwardly protruded from the base plate and configured to support a lower side of an upper side decorative external panel;
 an upper panel engaging portion upwardly extended from a front end of the supporting portions at opposite respective edges of the base plate and configured to be engaged with a lower side of the upper side decorative external panel; and
 a lower panel engaging portion downwardly extended from the front end of the supporting portions formed between the supporting portions at the opposite respective edges of the base plate and configured to be engaged with an upper side of a lower side decorative external panel,
 the base plate having a first screw hole and a second screw hole differing in distance from the supporting portions, the first screw hole and the second screw hole being located above the supporting portions, the base plate having a spring portion frontwardly protruded from the base plate so as to increasingly separate from a plane of the base plate in a downward direction and configured to come into contact with a rear side surface or the decorative external panel to frontwardly press the decorative external panel, and the second screw hole and the spring portion being aligned in a plane,
 wherein a first base plate portion of the base plate in which the first screw hole farther away from the supporting portion is formed and a second base plate portion of the base plate in which the second screw hole closer to the supporting portion is formed, forming an obtuse angle between the first base plate portion and the second base plate portion, the first base plate portion having an upper edge defined by the upper edge of the base plate and the second base plate portion having a lower edge defined by the lower edge of the base plate;

wherein the first base plate portion is inclined rearward with respect to the second base portion toward an upper side of the first base portion, wherein the fastening member is fastened to the underlying panel with a screw inserted in either the first screw hole or the second screw hole and screwed into the underlying panel, and wherein when a screw is inserted into either the first screw hole or the second screw hole to fasten the fastening member to the underlying panel, the upper edge of the first base plate portion and the lower edge of the second base plate portion can be brought into contact with the underlying panel assuredly.

6. The external wall construction structure as recited in claim 5, wherein the decorative external panel has an engaging groove for engaging the upper panel engaging portion and an engaging groove for engaging the lower panel engaging portion at upper and lower sides of the decorative external panel, wherein an anteroposterior positional relationship between the decorative surface of the decorative external panel and a rear surface of the engaging groove is the same between adjacent decorative external panels.

7. External wall construction structure, comprising:

a plurality of underlying panels disposed in front of a construction frame of a building;

a plurality of fastening members fastened to a front surface of the underlying panel; and a plurality of decorative external panels fastened to the underlying panels with the fastening members, wherein the fastening member includes:

a base plate having an upper edge, a lower edge and a rear surface which comes into contact with the underlying panel;

a plurality of supporting portions all aligned in a plane and frontwardly protruded from the base plate and configured to support a lower side of an upper side decorative external panel;

an upper panel engaging portion upwardly extended from a front end of the supporting portions at opposite respective edges of the base plate and configured to be engaged with a lower side of an upper side decorative external panel; and a lower panel engaging portion downwardly extended from the front end of the supporting portions formed between the supporting portions at the opposite respective edges of the base plate and configured to be engaged with an upper side of a lower side decorative external panel, the base plate having a first screw hole and a second screw hole differing in distance from the supporting portions, the first screw hole and the second screw hole being located above the supporting portions, the base plate having a spring portion frontwardly protruded from the base plate so as to increasingly separate from a plane of the base in a downward direction and configured to come into contact with a rear side surface of the decorative external panel to frontwardly press the decorative external panel, and the second screw hole and the spring portion being aligned in a plane, wherein the base plate is curved in an up-and-down direction such that the upper edge and the lower edge of the base plate are located rearward of a first base plate portion and a second base portion located between the upper and lower edges of the base plate, wherein the first base plate portion has an upper edge defined by the upper edge of the base plate and the second base plate portion has a lower edge defined by the lower edge of the base plate, and wherein when a screw is inserted into either the first screw hole or the second screw hole to fasten the fastening member to the underlying panel, the upper edge of the first base plate portion and the lower edge of the second base plate portion can be brought into contact with the underlying panel assuredly.

8. The external wall construction structure as recited in claim 7, wherein the decorative external panel has an engaging groove for engaging the upper panel engaging portion and an engaging groove for engaging the lower panel engaging portion at upper and lower sides of the decorative external panel, wherein an anteroposterior positional relationship between the decorative surface of the decorative external panel and a rear surface of the engaging groove is the same between adjacent decorative external panels.

* * * * *